United States Patent [19]

Hara et al.

[11] 4,342,224
[45] Aug. 3, 1982

[54] HOUSING UNIT FOR LIQUID GAUGE AND STRAINER

[75] Inventors: Kunio Hara, Kawasaki; Shigeru Kimura, Kamakura, both of Japan

[73] Assignee: Nifco Inc., Yokohama, Japan

[21] Appl. No.: 253,459

[22] Filed: Apr. 13, 1981

Related U.S. Application Data

[63] Continuation of Ser. No. 90,227, Nov. 9, 1979, abandoned.

[30] Foreign Application Priority Data

Nov. 9, 1978 [JP] Japan .............................. 53-137341

[51] Int. Cl.³ ............................................. G01F 23/10
[52] U.S. Cl. .................................... 73/290 R; 73/313; 73/319
[58] Field of Search ................ 73/306, 313, 320, 319, 73/321, 322, 290 R; 137/549, 544, 558

[56] References Cited

U.S. PATENT DOCUMENTS

| 1,046,506 | 12/1912 | Tanner | 73/306 |
| 1,538,748 | 5/1925 | Rosenblad | 73/306 |
| 1,786,339 | 12/1930 | Ford | 73/306 |
| 3,113,282 | 12/1963 | Coleman | 73/313 |
| 3,266,312 | 8/1966 | Coleman | 73/313 |
| 3,417,613 | 12/1968 | Barnstorf | 73/313 |

FOREIGN PATENT DOCUMENTS

808904  3/1969  Canada .................................. 73/306

*Primary Examiner*—Anthony V. Ciarlante
*Assistant Examiner*—Denis E. Corr
*Attorney, Agent, or Firm*—Jerold M. Forsberg; Thomas W. Buckman; Jack R. Halvorsen

[57] ABSTRACT

A housing unit is constructed substantially in a tightly closed state and divided by a partition into two chambers, one for encasing a fuel gauge and the other a strainer. The housing unit, on being attached to a fuel tank, simultaneously functions to indicate the amount of fuel in the fuel tank and strain the fuel to remove foreign matter therefrom.

4 Claims, 11 Drawing Figures

Fig_1
Fig_2
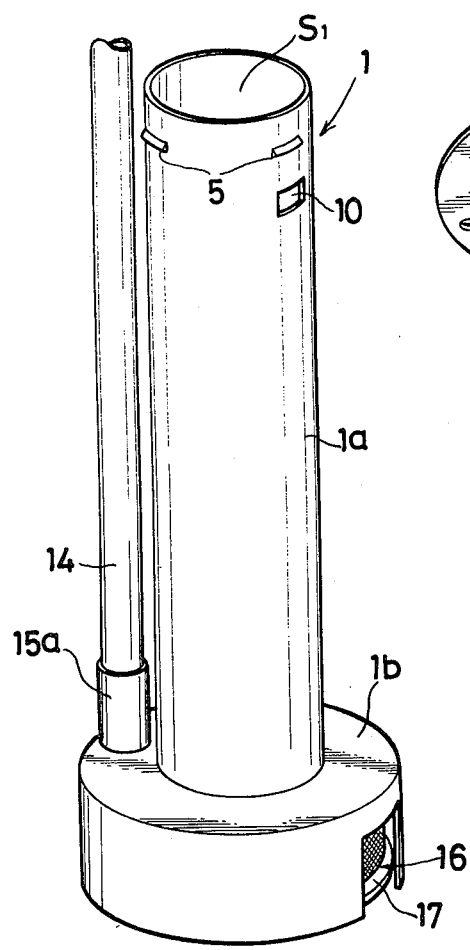
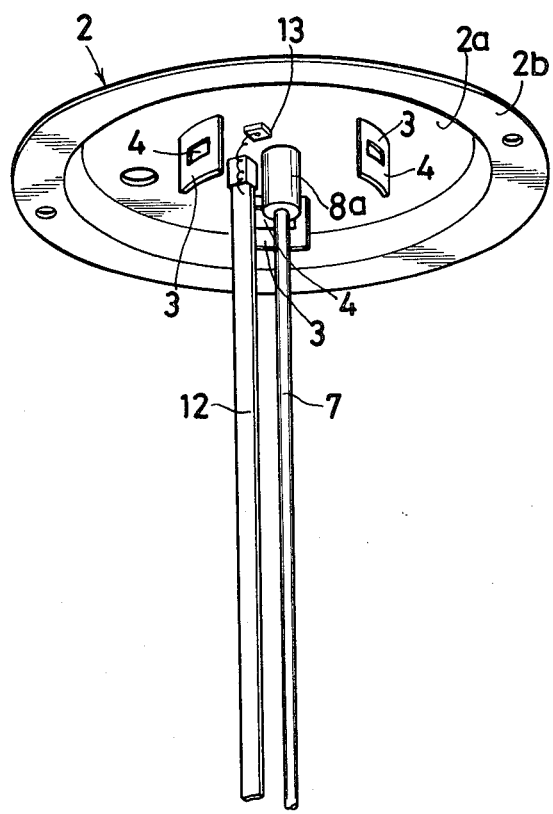

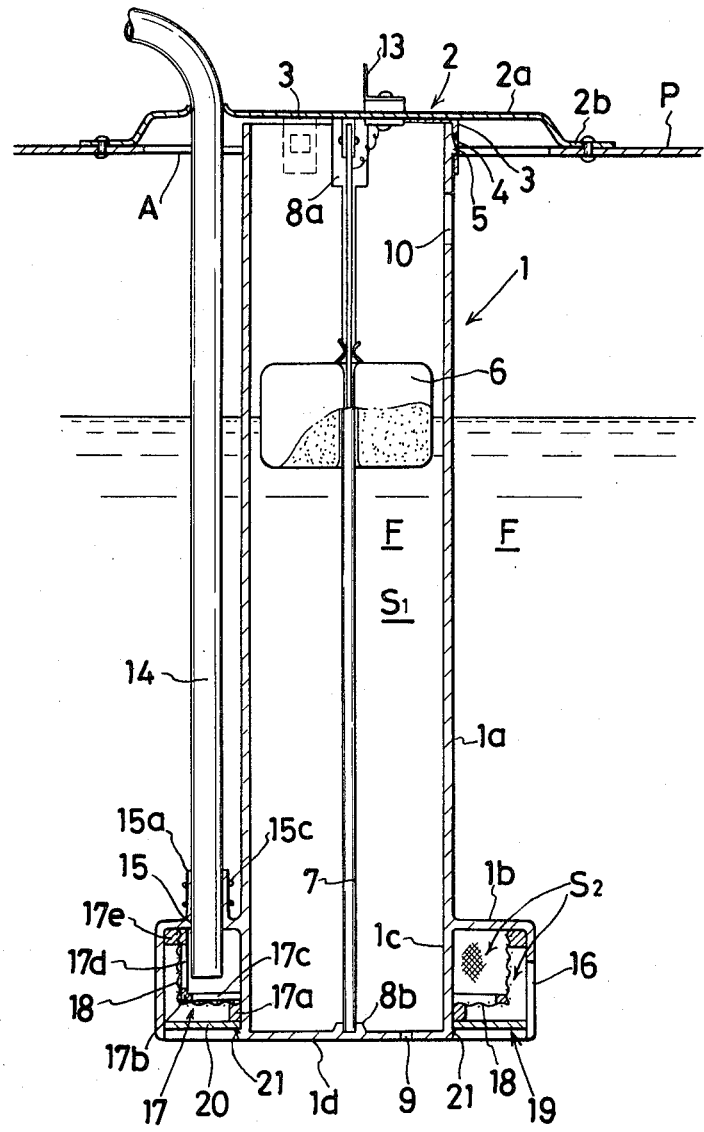

HOUSING UNIT FOR LIQUID GAUGE AND STRAINER

This is a continuation of application Ser. No. 090,227, filed Nov. 9, 1979 now abandoned.

BACKGROUND OF THE INVENTION

This invention relates to an apparatus for unitizing a liquid (fuel) gauge and a strainer for use inside a fuel tank such as of an automobile.

It is established practice to provide an automobile with a fuel gauge for indicating the amount of fuel in the fuel tank and a strainer having a filter element provided at the inlet end of a suction pipe for drawing the fuel out of the fuel tank and forwarding it to the engine.

Because fuel gauges and strainers belong to different technical fields, they have heretofore been separately manufactured by different manufacturing departments of a plant or different manufactures and, thereafter, installed in the fuel tank. Thus, there have been various disadvantages such as the troublesome work involved in installing separate devices in the fuel tank, the large amount of the space they occupy within the fuel tank, the necessity of boring holes in the shell of the fuel tank for their installation, the consequent increase in the number of machining operations involved and the extra work of sealing the bored holes after installation.

These disadvantages, which have heretofore been accepted as inevitable, are the consequence of the long-standing belief that the fuel gauge and the strainer must be produced by different manufacturers.

The object of this invention is to provide a housing unit for a fuel gauge and a strainer, which unit unitizes the fuel gauge and the strainer.

SUMMARY OF THE INVENTION

To accomplish the object described according to the present invention, there is provided a housing unit for the fuel gauge and the strainer, which housing is provided at the upper end thereof with a separate lid member, constructed substantially in a tightly closed state, and divided by a partition member into two chambers, one for the fuel gauge and the other for the strainer. The chamber for the fuel gauge is provided with means for attaching the fuel gauge to the chamber and an opening for admitting an external liquid (fuel) into the chamber interior. The chamber for the strainer is provided with an opening for admitting an external liquid into the chamber interior, an opening for inserting a liquid suction pipe into the chamber and a filter element for embracing therein the open end of the liquid suction pipe inserted into the chamber interior.

The housing is designed to be integrally molded of synthetic resin and, therefore, can be manufactured with ease. Further, the interiors of the chambers for the fuel gauge and the strainer are designed for the chambers to fulfill their respective functions to advantage. Assemblage of the housing complete with its contents, therefore, is effected simply by first setting in position inside the respective chambers a fuel gauge and a strainer of a kind known to the art, then fixing in position inside the fuel tank the housing containing the fuel gauge and the strainer, and thereafter inserting the liquid suction pipe into the strainer contained in the chamber. Thus, the work of fixing the fuel gauge and the strainer inside the fuel tank is significantly easier and the space occupied with the fuel tank by these devices is smaller then when the devices are incorporated in the fuel tank by the conventional method.

BRIEF EXPLANATION OF THE DRAWING

FIG. 1 is a perspective view of a first embodiment of the housing unit for a fuel gauge and a strainer according to the present invention.

FIG. 2 is a perspective view of a flange to be used as a means for fastening the housing unit of FIG. 1 to the fuel tank.

FIG. 3 is a longitudinal cross section of the housing unit of FIG. 1.

DESCRIPTION OF PREFERRED EMBODIMENTS

Figure 4:
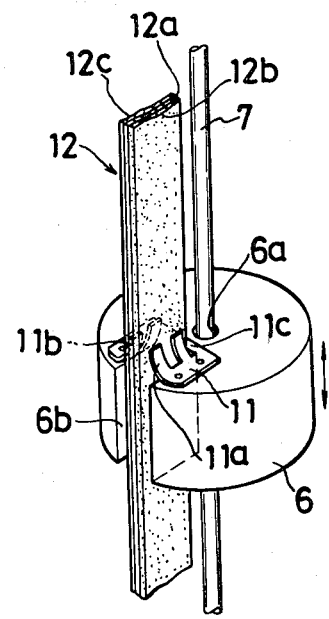
FIG. 4 is a perspective view of a fuel gauge to be incorporated into the housing unit of FIG. 1.

The first embodiment illustrated in FIGS. 1–3 has a chamber $S_1$ for the fuel gauge and a chamber $S_2$ for the strainer disposed concentrically within a single housing unit 1 (hereinafter referrred to simply as "housing"). In all of the embodiments described herein, the housing is molded integrally of synthetic resin.

The housing 1 comprises a first cylindrical portion 1a and a second cylindrical portion 1b of a greater diameter and disposed concentrically relative to the first cylindrical portion 1a. The housing 1 is manufactured in a cylindrical shape for ease of fabrication.

Inside the housing 1, the first cylindrical portion 1a extends as far as the bottom surface 1d to define the first cylindrical chamber $S_1$ and the second concentrically formed cylindrical portion 1b, in conjunction with a partition 1c, forms the second annular chamber $S_2$. In other words, the first cylindrical chamber $S_1$ and the second annular chamber $S_2$ are embraced in a unitized housing by allowing the wall portion 1b defining the second annular chamber $S_2$ to be integrally formed concentrically around the wall portion 1a (including the partition 1c) defining the first chamber $S_1$ in the axial direction. The wall portion 1b which defines the second annular chamber $S_2$ has a much smaller length than the wall portion 1a which defines the first cylindrical chamber $S_1$.

The first chamber $S_1$ is used for encasing a fuel gauge and the second chamber $S_2$ for embracing a strainer. The internal structure of each of these chambers will be described later. Here, a manner of fastening the housing 1 to the ceiling plate P of a fuel tank will be described with references to FIGS. 2–3.

Basically, the fastening of the housing 1 to the fuel tank may be effected by any method that is convenient. In the illustrated embodiment, the housing is adapted to be fastened by first attaching the upper end of the housing to the flange member 2 which concurrently serves as a lid for closing the upper opening of the first wall portion 1a and subsequently fixing, by means of screws or rivets, the flange member 2 to the periphery of the opening "A" in the ceiling plate P of the fuel tank, thereby allowing the housing to hang down through the opening "A" of the ceiling plate into the fuel tank interior.

The flange 2 comprises a disc-like portion 2a serving to close the upper end of the housing 1 and a fixing portion 2b disposed along the periphery of the disc-like portion 2a and possessed of perforations for passing screws or rivets. To the disc-like portion 2a is fastened the upper end of the housing 1. In the embodiment now under discussion, the disc-like portion 2a is adapted to permit this fastening simply by virtue of a snapping action.

To be specific, the flange 2 is provided on the central portion 2a thereof at fixed angular intervals (120° in the illustrated embodiment) with a plurality (three, for example, as in the present embodiment) of plate pieces 3 each having an inner surface curved in conformity to the curvature of the outer surface at the upper end of the housing 1. These plates pieces 3 each contain a perforation 4. The housing is provided on the outer upper edge portion thereof with projections 5 at the positions corresponding to those of the perforations 4. The upper end of the housing 1, therefore, perfectly fits the space which is enclosed by the plate pieces 3. During the insertion of the upper end of the housing 1 into this space, it advances toward the bottom of the space while the projections 5 keep the plate pieces 3 pushed outwardly. As the upper end further advances in the space and eventually reaches the bottom thereof, the projections 5 enter the corresponding perforations 4 and, at the same time, the plate pieces 3 abruptly converge to their original position. The projections 5, thereupon, snap into perfect engagement with the lower edges of the perforations 4 in the plate pieces, with the result that the housing 1 is safely suspended from the flange 2.

Of course, the complementary relationship between the perforations and the projections which snap into perfect engagement may be reversed. Otherwise, instead of having the perforations and the projections divided at angular intervals as illustrated, the plate pieces 3 may be changed into a circular continuous plate piece having an annular groove cut in the inner wall thereof and the projections on the housing may be changed into a circular continuous projection.

The fuel gauge to be encased in the first chamber $S_1$ of the housing 1 which has been attached to the flange 2 as described above is not defined specifically by this invention. Any of the known fuel gauges of the type designed to indicate the fuel level by vertical linear motion of a float and of the type designed to give a digital indication of the fuel level are suitable insofar as use of the housing 1 for the purpose of enclosure thereof proves advantageous. To illustrate the actual manner of incorporation of the fuel gauge into the chamber $S_1$, a fuel gauge of the type based on the principle of the vertical linear motion of a float is described herein.

The float 6 which is adapted to float on the surface of the liquid (fuel) and move in a vertical direction by following the fall and rise of the fuel level is formed in a diameter and a shape such that it will easily move vertically within the first cylindrical chamber $S_1$. If this float 6 is designed only to float on the surface of the fuel F and make vertical motion as illustrated in FIG. 3, however, there is a possibility that, when an inclination of the automobile body causes an inclination of the fuel tank and an attendant inclination of the fuel surface relative to the chamber $S_1$, the float 6 itself may tilt and collide with the inner wall surface of the first cylindrical portion 1a and consequently be restrained in its vertical motion. To ensure perfect freedom of the vertical motion of the float 6, therefore, a guide bar 7 pierced through the central opening 6a of the float 6 is extended in the longitudinal direction of the cylindrical chamber $S_1$ substantially throughout the entire length thereof. This guide bar 7 may be held in position by having one end thereof fastened to the flange 2 through the medium of a suitable fixing device 8a and the remaining end thereof simply left to hang down. In the illustrated embodiment, however, a bottom plate 1d is placed to cover the bottom of the cylindrical chamber $S_1$ and a recess 8b is formed at the center of the bottom plate 1d so as to receive and hold fast in position the lower end of the guide bar 7, enabling the guide bar 7 to be held immovably at both ends.

In that the bottom plate 1d, incorporated as described above would prevent the fuel F from entering the cylindrical chamber $S_1$, it is provided with a through hole 9 serving to provide ample communication between the interior and the exterior of the chamber. Owing to this through hole 9, the fuel F freely enters the chamber to keep the fuel level inside the chamber constantly equal to that outside. In order to preclude possible variation in the inner pressure due to the rise and fall of the fuel level, an opening 10 serving to provide free passage of air between the interior and exterior of the chamber $S_1$ is formed near the upper end portion of the housing.

As a result, the fuel inside the chamber communicates with fuel outside, the fuel level inside remains constantly equal to that outside and the float 6 makes vertical motion by following the changing fuel level. Generally the detection of the fuel level relies, more often than not, upon the principle of conversion of the magnitude to a corresponding variation in the value of electric resistance. In the present embodiment, the float 6 is provided directly therein with a contact 11 which is adapted to slide on a plate single-face resistor piece 12, whereby the slide of the contact on the plate piece 12 causes a variation in the magnitude of electric resistance required for the detection of the fuel level. To be more specific, the float 6 has a slit 6b cut in the radial direction at one portion thereof and the aforementioned plate piece 12 is inserted into the slit in the axial direction relative to the float 6. This plate piece 12 is suspended from the flange 2 and is composed of an insulating substrate 12a, a resistor layer 12b such as of carbon material and a suitable conductor layer 12c such as of copper material, with the insulating substrate 12a interposed between the remaining two layers 12b, 12c. Generally, the conductor layer is grounded and the resistor layer is given required electric continuity by a terminal 13 which is fixed on the flange 2. The illustrated embodiment assumes the case wherein the flange 2 is made of a metallic material and the conductor layer 12c is grounded through direct connection to the flange. Where the flange is made of an insulating material such as a plastic substance, for example, required grounding of the conductor layer 12c can be obtained by simply providing the flange with a terminal for connection to the conductor layer.

Figure 5:
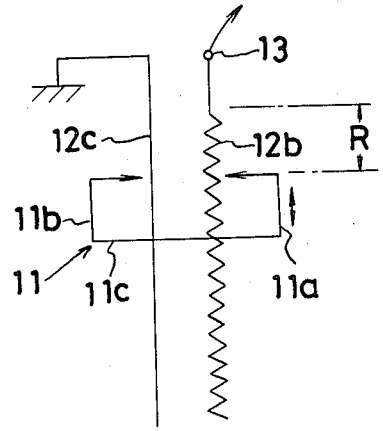
FIG. 5 is an equivalent circuit diagram of the fuel gauge of FIG. 4.

The metallic contact 11 disposed on the float side is possessed of contact pieces 11a, 11b which are adapted to be held with proper pressure against the resistor layer and the conductor layer respectively. These two contact pieces are electrically connected to each other through the medium of a connecting portion 11c which extends astride the slit 6b on its radially inner side relative to the float. FIG. 5 shows a schematic diagram of the equivalent circuit involved. As is plain from this diagram, the rise or fall of the float 6 and consequently of the contact 11 results in a variation in the magnitude of the resistance R as viewed from the side of the terminal 13 or from the side of the ground.

The manner in which the chamber $S_1$ for the fuel gauge is utilized has been described by way of illustration. Now, the description will be extended to cover the functions of the chamber $S_2$ for the strainer and the portion 1b defining this chamber.

Since the portion 1b has the exclusive purpose of encasing therein a strainer, it is required to incorporate an opening 15 adapted to permit insertion of a suction pipe 14, an inlet 16 for admitting an external fuel into the chamber $S_2$ and a filter element 17 adapted to embrace the open end of the suction pipe 14.

Figure 6:
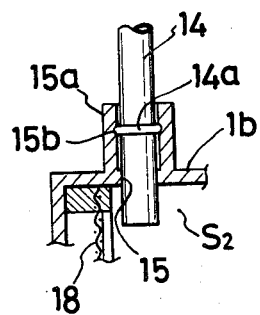
FIG. 6 is a cross-sectional view of the essential portion of a suction pipe for the strainer as fastened to the housing unit of FIG. 1.

The suction pipe 14 after inserted into the chamber $S_2$ may be fixed in position in any freely selected manner. For example, the fixing can be conveniently effected as by raising a sleeve 15a from the edge of the opening 15 bored in the upper side of the second cylindrical portion 1b, inserting the leading end of the suction pipe 14 into this sleeve 15a and tightening the sleeve around the inserted portion of the suction pipe with a clamping band 15c or by forming an annular groove 15b in the inner wall of the sleeve and forming a matching annular ridge 14a on the pipe at the position corresponding to that of the annular groove 15b as illustrated in FIG. 6 so that the pipe inserted into the sleeve will be brought into fast union by causing the annular ridge to snap into engagement with the annular groove.

The inlet 16 which serves to admit the external fuel into the strainer chamber $S_2$, in the present case, is formed by making a partial cut in the peripheral wall of the chamber.

Figure 7:
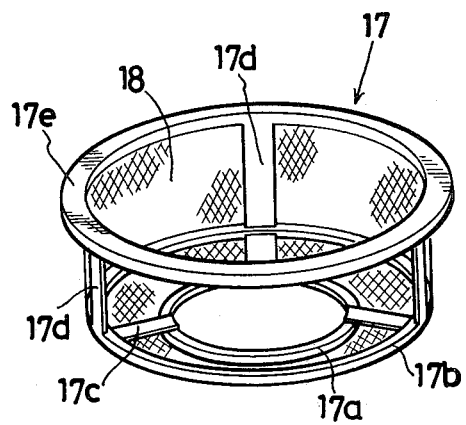
FIG. 7 is a perspective view of a filter element to be incorporated into the strainer disposed inside the housing unit of FIG. 1.

The filter element 17, to be incorporated, may be any of the known filters which are capable of being disposed in the intervening space as described above. A filter element which is easy of manufacture is illustrated in FIGS. 3 and 7 by way of example.

The filter element 17 comprises an annular portion 17a for encircling the lower edge of the partition 1c of the chamber $S_2$ and a second annular portion 17b shaped concentrically relative to the first annular portion 17a and encircling the intermediate diameter of the chamber $S_2$. These two annular portions 17a, 17b are connected to each other through the medium of a plurality of radially disposed crosspieces 17c (three crosspeices spaced at a fixed angular interval of 120° in the illustrated preferred embodiment) and they are stepped from each other by the thickness of these crosspieces in the axial direction. From the upper surface of the second annular portion 17b, a plurality of crosspieces 17d rise in the axial direction at a proper interval (three crosspieces spaced at a fixed angular interval of 120° in the present embodiment). A third largest annular portion 17e is formed to encircle and connect the leading ends of the vertically rising crosspieces. The third annular portion 17e has an outside diameter which is substantially equal to the inside diameter of the outer shell of the chamber $S_2$. When all the annular portions with attendant crosspieces, namely, the whole framework of the filter element 17, are encased within the chamber $S_2$, the first annular portion 17a is set snugly around the lower end of the outer wall of the first cylindrical chamber $S_1$ and the third annular portion 17e is set in position in the upper inside corner of the shell of the chamber $S_2$ as illustrated in FIG. 3.

In the integral molding of the framework of the aforementioned construction, net means 18 is set in position in the molding die so as to produce meshes between the first and second annular portions and between the second and third annular portions in the molded filter element and, after the molding, the edges of these net means are buried between the first annular portion 17a and the crosspieces 17c and between the third annular portion 17e and the second vertically rising crosspieces 17d so that the net means is passed over the outer surface of the second annular portion at right angles.

The net means 18 may be made of a plastic material or metallic material. In any event, the filter element 17 fabricated as described above is inserted through the lower opening 19 of the chamber $S_2$ (FIG. 3) and fixed in position inside the chamber $S_2$ as described above. For securing the filter element 17 in that position, a bottom lid 20 is provided to close the opening 19. The bottom lid 20 to be used for the closure of the opening has an annular shape and includes therein a hole for permitting passage of the lower end of the cylindrical portion 1a which serves as a member for defining the first chamber $S_1$ at the center. This annular bottom lid 20 is adapted so that the union thereof with the opening 19 is accomplished by causing the peripheral edge of the lid, by virtue of the resilience or deformability of the material of which the lid is made, to snap into fast engagement with a check projection 21 formed on the inner wall surface of the opening 19 of the chamber $S_2$. Of course, the retention of the filter element within the chamber $S_2$ may be effected by any of the methods heretofore known to the art.

As a result, the filter element 17 incorporating therein the net means 18 functions to embrace the open end of the suction pipe 14, enabling the chamber $S_2$ to fulfill the function of a strainer. The suction pipe 14 may be led out of the fuel tank virtually at any desired point. With a view to decreasing the number of work steps involved in the manufacture of the fuel tank, however, it is advantageous to have the suction pipe led out through the fixing means for keeping the housing in position (the flange 2 in the embodiment shown in FIG. 3).

In the first embodiment so far described, the chamber $S_1$ for encasing a fuel gauge and the chamber $S_2$ for encasing a strainer are formed by dividing the interior of the integrally molded housing 1 with a partition 1c is so that the chamber $S_1$ and the chamber $S_2$ may be concentrically disposed inside the housing. In the embodiment illustrated in FIGS. 8 and 9, the interior of the housing 1 is divided in the longitudinal direction to form two chambers $S_1$ and $S_2$.

Figure 8:
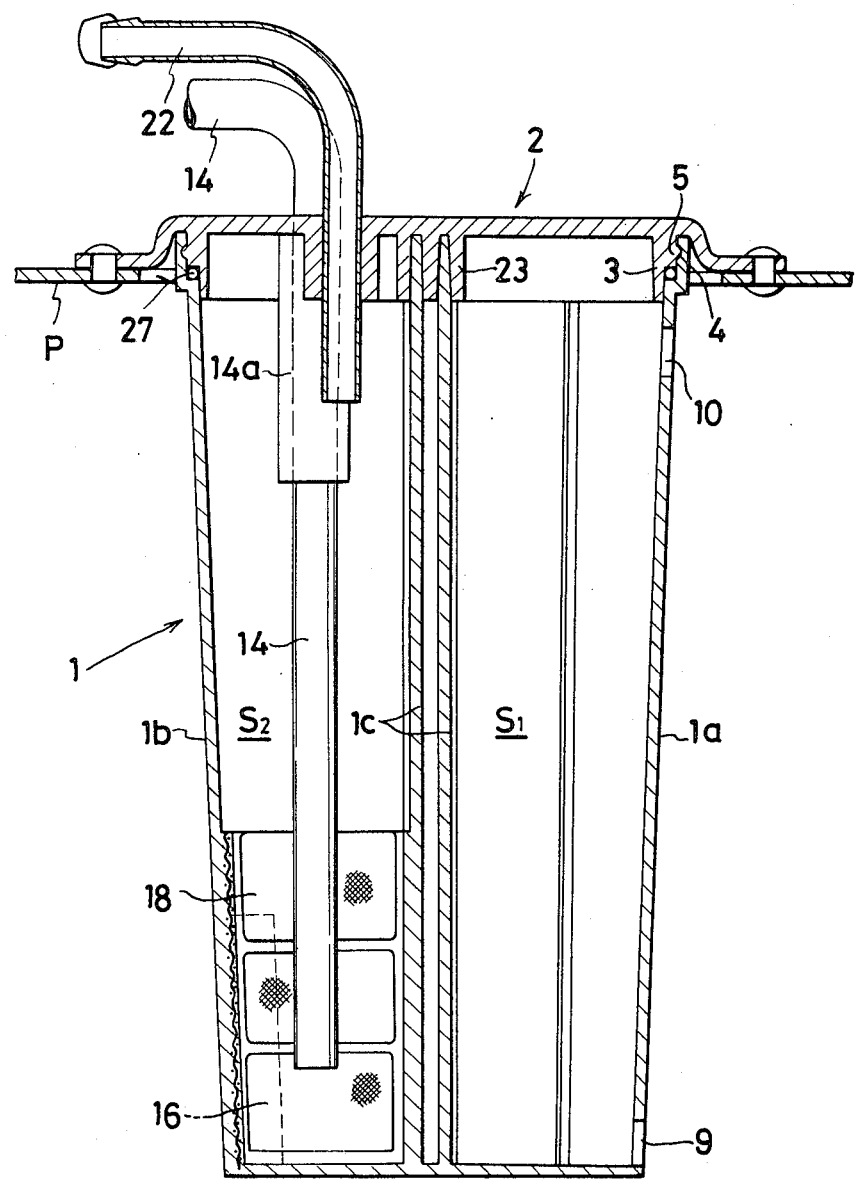
FIG. 8 is a cross-sectional view of a second embodiment of the housing unit for the fuel gauge and the strainer according to the present invention.
Figure 9:
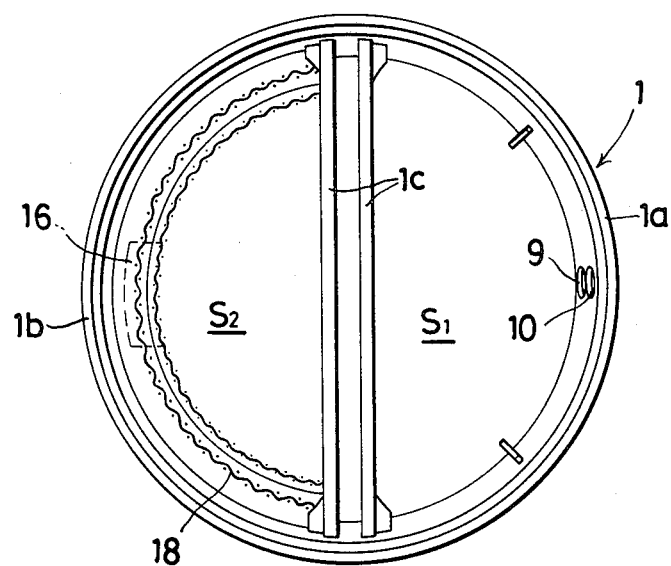
FIG. 9 is a plan view of the housing unit of FIG. 8.

As illustrated in FIGS. 8 and 9, the overall housing 1 of the second embodiment has a cylindrical shape. The shape of the housing is not critical for the invention. The housing in this case as well as in the preceding embodiment may be produced in an angular shape or any other desired shape.

The cylindrical interior of the housing 1 is divided into two substantially semicylindrical chambers $S_1$, $S_2$ by a partition 1c which extends in the axial direction of the housing in a plane containing the axis of the cylindrical housing. The partition 1c illustrated comprises two walls. Use of the partition 1c with two walls is purely a matter of convenience in design. It is perfectly satisfactory to form the partition 1c with only one wall.

The chamber $S_1$ is used for encasing a fuel gauge. The fuel gauge of the first embodiment may be used with this chamber if the float is modified to a semicircular cross section. In the present embodiment, the fuel gauge and its accessories such as the guide bar, the resistor and the terminal are not illustrated. A hole 9 adapted to provide communication between the external fuel and the internal fuel and a hole 10 for free passage of air are illustrated as disposed in the wall 1a of the chamber $S_1$.

The interior of the chamber $S_2$ for the strainer which is defined by the walls 1b, 1c communicates with the exterior of the chamber through net means 18 which is buried in the wall 1b itself. The net means 18 is buried in the wall at the time that the housing is molded with the net means as a part integral thereto. In the present case, the net means is disposed as though it would cover the area of the inlet 16 or the inlet itself. The net means may be separately prepared and may be forced to be engaged with the opening of the inlet 16 and disposed on the lower portion of the wall 1b.

The suction pipe 14 is retained in position by the member 14a which pierces through the flange 2 concurrently serving as an upper lid and as a member for fastening the housing 1 to the tank, and it is made to enter into the space formed inside the strainer. A pipe 22 for discharge of air is additionally disposed, though the incorporation of this pipe is optional.

For the flange 2 and the housing 1 to be joined by a snapping action, the flange is provided with a cylindrical member 3 having an annular ridge 5 formed on the outer wall surface thereof and the housing is provided in the inner wall surface with a matched annular groove 4. As touched upon in the first embodiment, this relationship between the ridge and the groove may be reversed. In this case, the flange 2 is provided with a socket 23 for the upper edge of the partition 1c. This socket 23 serves to receive the upper edge of the partition 1c and retain the partition fixed in position and, at the same time, facilitates the positioning of the partition at the time that the flange and the housing are combined. For the purpose of providing airtight seal along the joint to be formed between the flange and the housing at the time of their union, an O-ring 27 is set in position at a stepped portion which is formed near the edge portion of the housing where the housing and the flange come into snapping engagement.

In either of the two embodiments cited above, the housing is adapted so as to come into snapping engagement with the flange 2 and the flange 2 is adapted to serve concurrently as a lid for covering the upper end of the housing. As in the third embodiment illustrated in FIG. 10, the flange 2 may be formed as a separate member. Otherwise, it may be adapted so as to be joined with the housing by means of a twist lock. With reference to the embodiment of FIG. 10, a lid 24 is possessed of a disc-shaped portion 24a adapted to cover the opening defined by the upper edges of the walls 1a, 1b, an outer annular portion 24b adapted to cover the upper outer edge of the housing, and an inner annular portion 24c adapted to fit the upper inner edge of the housing.

The union of this lid 24 with the housing 1 relies on the snapping engagement between the annular ridge 5 formed on the outer wall surface of the housing and the groove 4 formed in the inner wall surface of the outer annular portion 24b of the lid.

Figure 11:
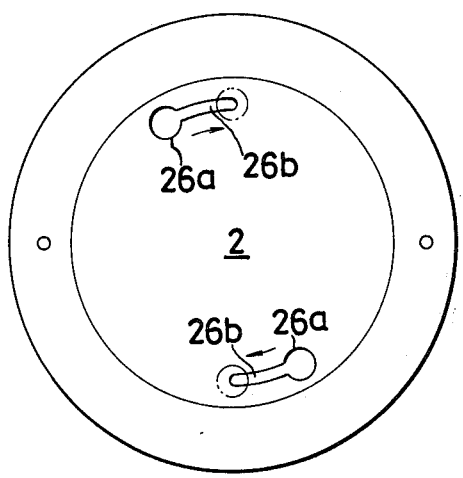
FIG. 11 is a plan view of the housing unit of FIG. 10.

For the housing to be fastened to the flange 2 through the medium of this lid 24, two headed studs 25 are raised from the upper surface of the lid at positions symmetrical with reference to the center of the lid and two matched holes each consisting of one round perforation 26a large enough to permit passage of the head 25a of the stud 25 and a curved slender perforation 26b wide enough to permit sliding motion of the constricted portion 25b of the stud are formed with similar symmetry in the flange. Then, as shown in FIG. 11, the heads 25a of the studs 25 are passed through the round perforations 26a in the flange until the upper surface of the lid comes into intimate contact with the reverse side of the flange and the flange is rotated relative to the housing so that the studs 25 slide along the curved slender perforations 26b which permit only the sliding motion of the constricted portions 25b of the studs 25. Consequently, the heads 25a of the studs are prevented from being pulled out of the perforations and the flange is fastened securely to the housing.

Figure 10:
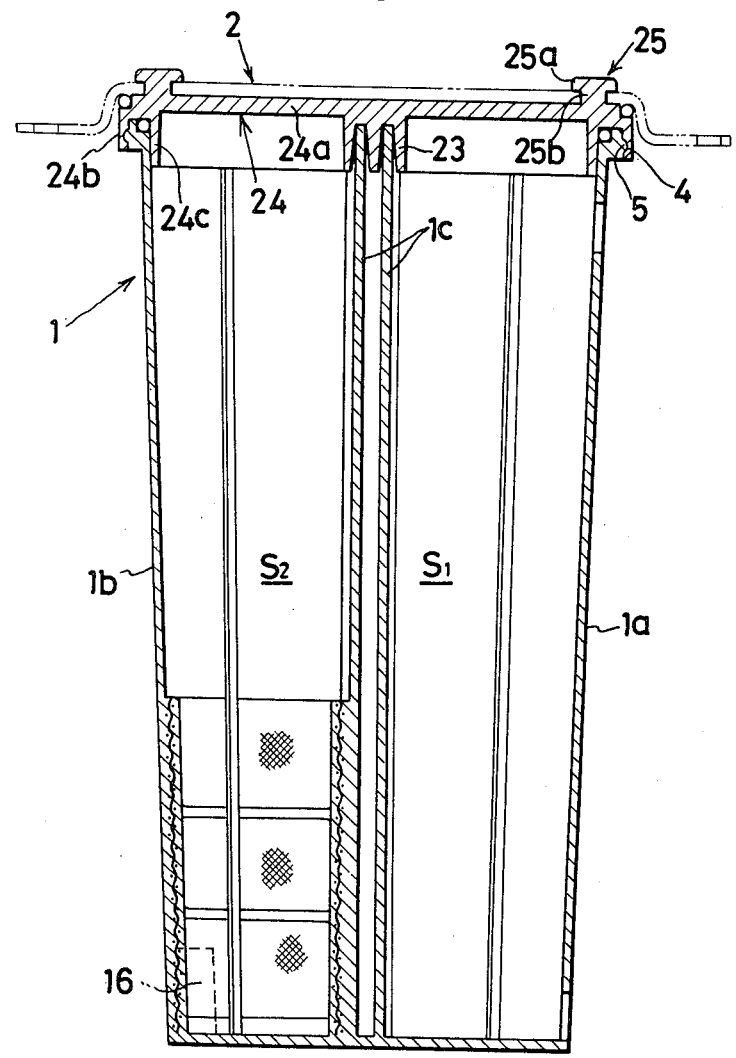
FIG. 10 is a cross-sectional view of a third embodiment of the housing unit for the fuel gauge and the strainer according to the present invention.

A fuel gauge and a suction pipe for the strainer are naturally incorporated in the housing, though not shown in FIGS. 10 and 11.

Although in any of the embodiments cited above, the housing unit of the present invention has been illustrated as adapted to be suspended from the ceiling plate of the fuel tank, it permits modification to suit each particular occasion. By changing the shape of the flange 2, for example, the housing unit may be adapted to be attached to a vertical wall of the fuel tank.

At any rate, the present invention deviates completely from the conventional design by proposing a housing unit which has a chamber for the fuel gauge and a chamber for the strainer incorporated in a unitized construction. The present invention, therefore, facilitates the operation of the attachment of the devices mentioned above, rationalizes the manufacture of the housing for incorporating therein the two devices, and makes a contribution to the improvement of economy as well.

While preferred embodiments of the instant invention have been disclosed, it is understood that the example is given only to facilitate understanding and not in a limiting sense, the scope of the present invention being determined by the following claims.

We claim:

1. A housing unit for use in a liquid reservoir, adapted to unitize a liquid level gauge, liquid suction pipe, strainer, and housing, comprising a housing having at least two chambers, said at least two chambers including a generally cylindrical first chamber open at one end and substantially closed at the other end and a generally toroidal second chamber concentric with said first chamber, said second chamber adjacent to and encircling the substantially closed end of said first chamber, said second chamber having an annular opening adapted to receive a filter element therethrough and an annular lid adapted to close said opening while positioning a filter element within said second chamber, a cover adapted to be removably attached to and close the open end of said first chamber and removably suspend said housing unit within said reservoir, said first chamber adapted to contain a liquid level gauge and said second chamber adapted to contain a strainer, means within said first chamber for guiding a movable portion of the liquid gauge, said strainer including a filter element adapted to be confined within said second chamber by said annular lid, at least two openings in said first chamber for permitting passage of a liquid and air into and out of said first chamber, and second chamber having a first opening for admitting liquid into the chamber on one side of said filter element and a second opening for permitting the insertion of one end of a liquid suction pipe on the other side of the filter element, said filter element adapted to embrace an open end of the liquid suction pipe inserted therein, whereby the movable portion of a liquid level gauge contained within said first chamber is unrestricted when moving from the end closed by the cover to the substantially closed end thereby permitting said liquid level guage a range of indication which extends to the substantially closed end of said first chamber.

2. The housing unit according to claim 1, wherein said first chamber includes a plurality of radially extending projections spaced about the open end and said cover includes axially extending plate pieces with apertures therein adapted to cooperate with said projections to releasably secure said cover to said open end.

3. The housing unit according to claim 1, wherein said cover includes a radially extending flange having means for releasably securing said cover to said reservoir.

4. The housing unit according to claim 1, wherein said first chamber has a length dimension substantially greater than said second chamber and the substantially closed end of said first chamber is the lower most portion of either chamber relative to the reservoir.

* * * * *